July 15, 1941.  J. A. ANANIA  2,248,931
CUTTING TOOL ASSEMBLY FOR LATHES
Filed Oct. 7, 1939  2 Sheets-Sheet 1
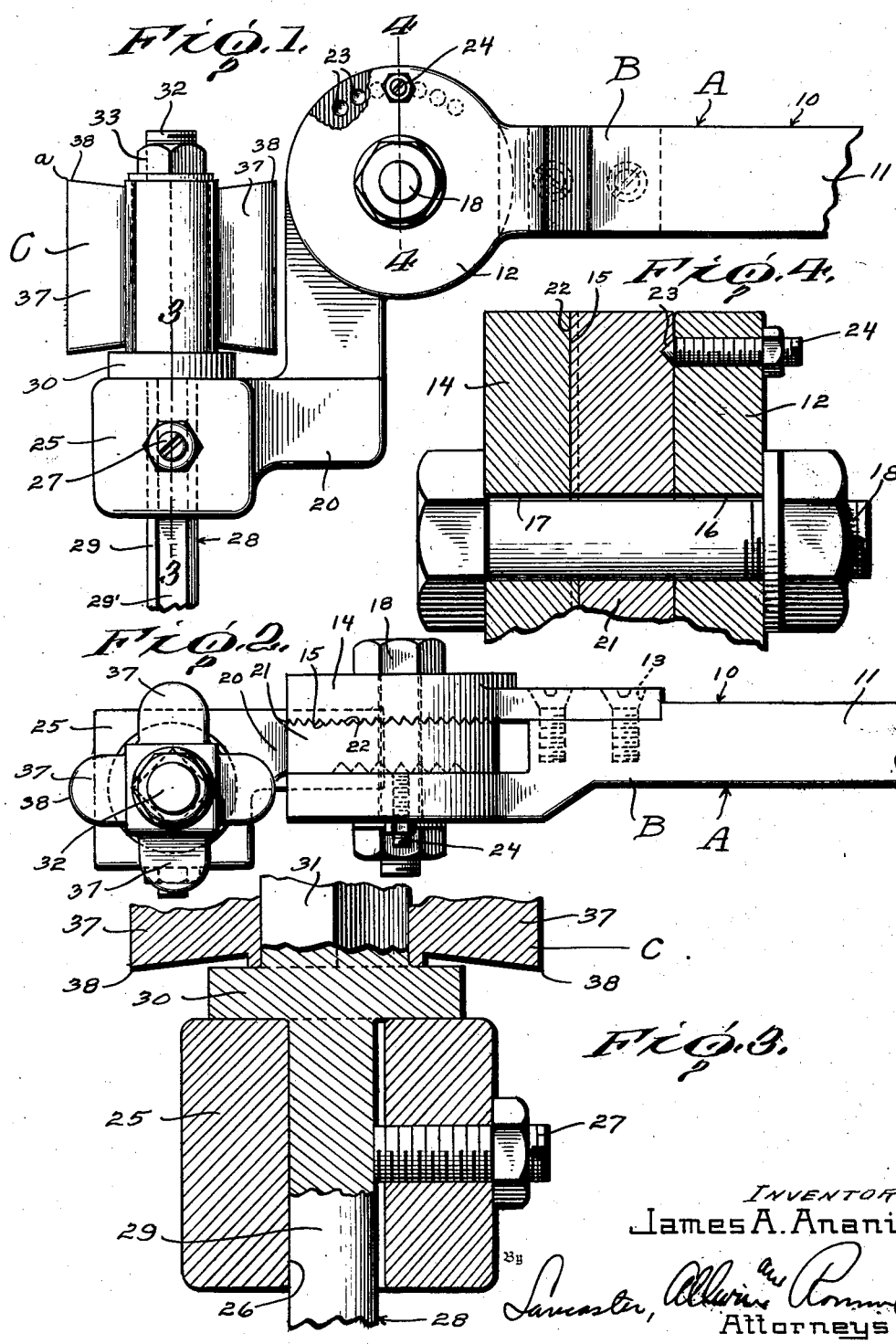
INVENTOR
James A. Anania.
By Lancaster, Allwine & Rommel
Attorneys.

July 15, 1941.  J. A. ANANIA  2,248,931
CUTTING TOOL ASSEMBLY FOR LATHES
Filed Oct. 7, 1939  2 Sheets-Sheet 2
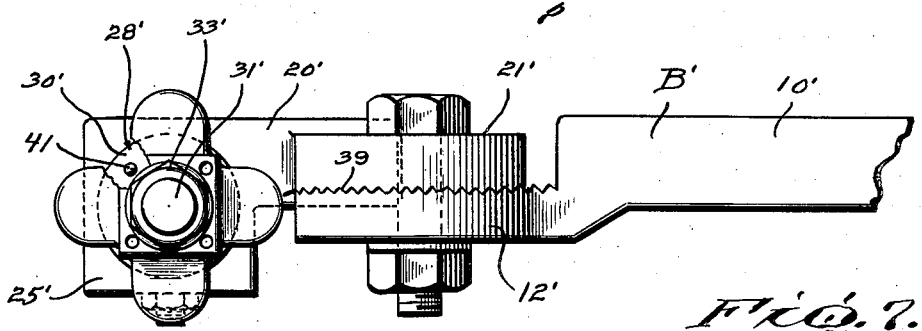
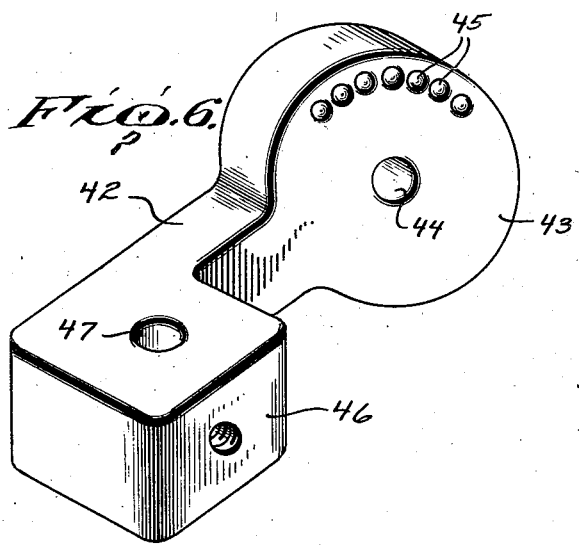
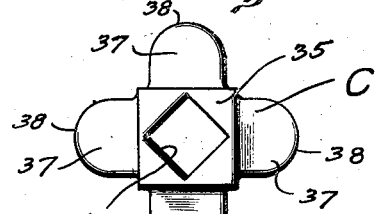
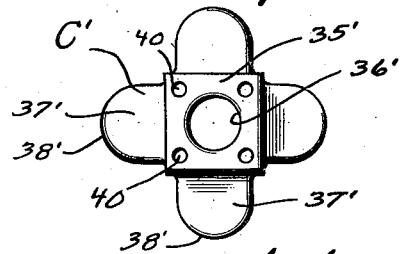
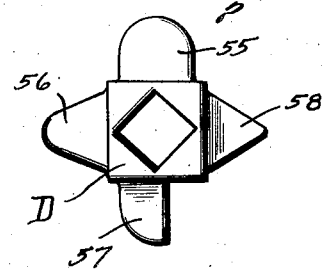
INVENTOR
James A. Anania
Lancaster, Allwine & Rommel
Attorneys.

Patented July 15, 1941

2,248,931

UNITED STATES PATENT OFFICE 2,248,931

CUTTING TOOL ASSEMBLY FOR LATHES

James A. Anania, Newark, N. J., assignor of one-half to Adolph J. Gold, West Caldwell Township, Essex County, N. J., and one-tenth to Anthony Colle, Newark, N. J.

Application October 7, 1939, Serial No. 298,498

15 Claims. (Cl. 29—96)

The present invention relates to cutter tool assemblies for lathes, shapers, etc., and the primary object of the invention is to provide a tool assembly of high efficiency and economy, and intended to speed up production by making it possible for machinists and other workmen to continue operation upon the work with the same tool assembly for a great length of time, and without the necessity of frequently replacing cutter elements or resorting to major adjustments of the tool holding mechanism.

A further object of the invention is to provide a cutter tool holder which may readily be applied to ordinary tool posts of various metal working machines, and which is easily adjustable for positioning the cutter element in proper cutting relation to the work.

A further object resides in the provision of an improved cutter head or element having a plurality of independent cutting or working edges which may be selectively brought into a like cutting position without requiring adjustment of the tool holder.

A further object of the invention is to provide a cutter head or element of a construction which will permit a roughing and also a finishing cut being accomplished at the same time and thereby resulting in a great saving in the amount of time required for completing the work.

A further object is to provide a cutter head or element embodying cutting portions arranged in such relation as to permit long continued use of the cutter head after repeated grinding of the cutting portions.

A still further object is to provide a novel cutter head construction wherein both straight facing and end facing operations may be accomplished without requiring changing or adjustment of the tool between operations.

A still further object is to provide a tool of this character adaptable for use upon lathes, shapers, external boring machines, general planing machines, etc.

Other objects and advantages of the invention will be apparent from the following detailed description taken in connection with the accompanying drawings forming a part of the specification and in which drawings:

Figure 1 is a view in side elevation of the improved cutter tool assembly and showing a construction particularly adapted for use upon lathes.

Figure 2 is a top plan view of the showing in Figure 1.

Figure 3 is an enlarged fragmentary vertical section on line 3—3 of Figure 1.

Figure 4 is an enlarged fragmentary vertical section on line 4—4 of Figure 1.

Figure 5 is a top plan view showing a slightly modified form of holder and cutter element.

Figure 6 is a perspective view of a further form of adjustable cutter tool supporting arm.

Figure 7 is an end view of the cutter tool shown in Figures 1 to 3.

Figure 8 is an end view of the cutter tool shown in Figure 5.

Figure 9 is an end view of a cutter tool provided with cutting portions of varying shapes for accomplishing different cutting operations.

Referring to the drawings in detail and wherein like reference characters designate corresponding parts thruout the several views, in the form of the invention as illustrated in Figures 1 to 4 and 8, the tool assembly A comprises an adjustable tool holder B upon which is adjustably mounted a cutting element C.

The tool holder B comprises a tool bar 10 formed with a shank 11 which may be rectangular shape in cross section and of any suitable length. This shank is adapted to fit into the usual opening of a tool post on the slide rest of a conventional form of lathe carriage and be secured against movement in the well known manner as the usual cutting bits are ordinarily secured in the tool post. The tool bar 10 is preferably mounted in a horizontal position in the tool post. Formed on the outer end of the shank 11 in offset relation to the axis of the shank is a disc-shaped head 12 which is disposed in a vertical position when the tool holder is in position of use. Secured as by screws or the like 13 to the forward end of the shank 11 so as to extend in parallel spaced apart confronting relation to the head 12, is a clamping disc 14 having a serrated inner face 15. The head 12 and disc 14 are respectively provided with axial openings 16 and 17 for receiving a clamping bolt 18.

Adapted to be adjustably supported upon the forward end of the tool bar 10 is a substantially L-shaped tool support 20 which is formed at the upper end of its vertical arm with a disc-like clamp plate 21 for fitting between the discs 12 and 14. One face of this plate 21 is serrated as at 22 for interfitting with the serrations 15 on the disc 14, while the opposite face of the plate 21 is provided with an arcuate series of adjustment notches 23 with which a set screw 24 threaded thru the head 12 co-acts for retaining the support 20 in various positions of angular adjustment with respect to the tool bar 10. Formed on the outer or free end of the horizontal arm of the tool support 20 is an enlargement or rest portion 25 which is provided with a vertical bore 26. This bore 26, as shown in Figure 2, is arranged with its axis extending in a line which substantially intersects the longitudinal axis of the tool bar shank 11. A suitable set screw 27 is threaded thru the rest portion 25 in right angular relation to the bore 26 and serves as means for adjustably retaining a cutter post or carrier 28 in adjusted positions on the support 20.

This cutter carrier 28 embodies a lower shank portion 29 for slidably fitting in the bore 26 and with which the set screw 27 co-acts for securing the carrier against rotation as well as retaining the carrier in vertically adjusted positions upon the support 20. Provided at the upper end of the shank portion 29 is a collar or rest flange 30, and above this collar is a preferably square stem portion 31 having a threaded upper end 32 for receiving a retaining nut 33. The lower shank portion 29 may be flattened or grooved along one side as at 29' for engagement by the set screw 27 whereby the cutter post will be held in a definite position in the rest portion 25 with two diagonal corners of the squared stem portion 31 in a line in the plane of the clamp plate 21.

The cutter post or carrier 28 provides a mounting for the cutting element C which is reversible end for end upon the carrier, as well as being adjustable in definite degrees about the carrier axis. The cutting element C may be made of suitable tool bit steel and is preferably formed wholly or in part from what is known as "Rex AA" cutting tool bit steel. The cutting element C comprises an elongated hub portion 35 having a square bore or axial opening 36 of a size to slidably fit on the squared stem portion 31 of the cutter post 28 so that one end of the hub portion 35 engages upon the collar 30. By tightening the nut 33 at the upper end of the cutter post 28, the cutting element will be clamped against the collar 30.

Projecting radially of, and spaced 90° apart about the hub 35, is a series of four spaced apart cutting ribs or portions 37 which extend thruout the length of the hub and have rounded outer edges providing a semi-circular-shaped cutting edge 38 at each end of each cutting rib. The ends of the cutting ribs 37 are beveled slightly towards the hub portion 35 as shown in Figures 1 and 3 to provide sharp cutting edges 38. As will be seen, the four cutting ribs 37 provide eight cutting edges 38, with four of the cutting edges being disposed at each end of the cutting element. As shown in Figure 8, the diametrically disposed cutting ribs 37 align with the diagonals of the square bore 36 whereby adjacent ribs are joined by sufficient metal so as not to weaken the cutting element and yet provide spacing between the cutting edges of the ribs. Thru the construction of the cutting element C, and the manner of mounting the same upon the cutter post 28, any of the cutting edges 38 may be brought into a cutting position.

Referring to the modification shown in Figures 5 and 9, in this form of the invention the tool holder B' comprises a tool bar 10' adapted to be secured in the usual tool post of a lathe carriage or the like, and is provided at its outer end with an offset disc-shaped head 12' provided on its inner face with serrations 39. Adjustably supported upon the head 12' is a substantially L-shaped tool support 20' having a disc-like clamp plate 21' provided with serrations on one face for interfitting with the serrations 39 on the head 12'. A clamping bolt 18' serves to clamp the discs 12' and 21' in adjusted positions. The lower horizontal leg of the support 20' is provided with a rest portion 25' which may be provided with a bore for receiving the lower shank portion of a cutter post or carrier 28' in the manner similar to that shown in Figure 3 of the drawings. The cutter post 28' is provided intermediate its ends with a collar or rest flange 30', and above this collar with a round stem portion 31' having a threaded upper end for receiving a retaining nut 33'.

The cutting element C' for the tool assembly shown in Figure 5 is substantially like the cutting element C, and comprises an elongated hub portion 35' having a round bore or axial opening 36' of a size to slidably fit over the round stem portion 31' of the cutter post 28'. The radially extending cutting ribs or portions 37' have rounded outer edges forming semi-circular-shaped cutting edges 38' at each end of each rib. Provided in each end of the hub portion 35' are four evenly spaced apart openings 40 which are adapted to receive one or more keeper pins 41 projecting upwardly from the collar 30' whereby the cutting element C' is locked against rotation on the stem 31'. Thus the pins 41 and openings 40 serve to retain the cutting element C' with two diametrically aligned cutting ribs 37' in the major plane of the disc 21'.

Thus in both forms of the tool assembly, as shown in Figures 1 and 5, it will be seen that the cutting element is held against rotation upon its cutter post or carrier with one of the cutting ribs in a cutting position at the forward end of the assembly and two of the cutting ribs extending laterally of the tool assembly.

In Figure 6 is shown a modified form of tool support 42 which may be substituted for the tool support 20 shown in Figure 1. The tool support 42 is in the form of a straight arm having a disc-like clamp plate 43 at one end which is axially apertured as at 44 for receiving a clamping bolt, and is provided in one face with an arcuate series of adjustment notches 45 with which a set screw as at 24 in Figure 1 co-acts for retaining the support in various positions of angular adjustment. The other end of the support is formed with a rest portion 46 having a bore 47 for receiving the shank of a cutter post as in Figure 3. This form of tool support 42 is especially well adapted for use on planers, shapers and other machines where the tool assembly is disposed in a substantially vertical position and the cutting element assumes a somewhat horizontal position with respect to the work. In such machines as planers, shapers, etc., the tool bar of the tool assembly will be secured in a more or less vertical position in the chuck or head of the machine for disposing the cutting element in proper cutting relation to the work.

Referring particularly to Figure 9, the cutting element D shown is of a construction permitting various cutting operations being performed by the same tool. In this form of the cutting element, the radially extending cutting ribs are of different cross sectional shape whereby each rib may be used for a particular purpose. In the example shown, the rib 55 has a semi-circular shape and may be used for straight facing; the rib 56 has a blunt V shape adapting it to roughing off; the rib 57 is of quadrant-shape adapting this rib to grooving, while the rib 58 is of V shape for threading. The cutting ribs 55 to 58 are of elongated formation as are the cutting ribs 37, as shown in Figure 1 and have cutting edges at each end thereof. By reversing the cutting element D, the quadrant-shaped rib 57 may be used for straight wall grooving, that is, the ends of the groove may be cut perpendicular to the axis of the work. Various other shapes of cutting ribs may be provided than that shown, in accordance with the particular work being performed.

As shown in Figure 1, the tool support 20 disposes the operatively positioned cutting edge designated a substantially in alignment with the shank 11 so that this cutting edge is disposed in effective cutting relation to the work. By adjusting the support 20 about the clamping bolt 18, the cutting element C will be tilted so as to obtain the desired clearance between the cutting element and the work according to the character of the metal and the nature of the work being done, such as grooving, etc.

The ends of the cutting ribs are ground so that all of the cutting edges at each end of the cutting element are even with one another and lie in a plane normal to the axis of the cutting element. When so ground, the cutting element may be rotatively adjusted upon the cutter post for bringing a new cutting edge into working position with the work being performed without requiring any adjustment whatever of the tool holding means. As the length of the cutting ribs becomes shorter due to grinding at their ends, the cutter post 28 may be raised in the rest portion of the tool support for disposing the cutting edges in proper cutting relation to the work. Thus, thru having a plurality of cutting ribs, each having a cutting edge at each end thereof, the cutting element may be used for a great length of time without replacement.

While the many uses to which a cutter tool assembly of this character may be put will be apparent to those skilled in the line of work to which this invention relates, some of the principal uses of the tool will be stated.

With the cutter element in place as in Figure 2 and the assembly secured in a slide rest of a lathe, the foremost cutting rib is in a position to make a turning cut along a piece of work, while the two laterally disposed cutting edges are in positions to make facing cuts at opposite ends of the piece of work. Thus, three cutting operations may be carried out without requiring any adjustment of the tool assembly. When the tool assembly is used in a planer or shaper, three cutting operations may also be carried out upon three surfaces of the work, as is believed will be readily apparent.

When the cutter element is adjusted about its axis, as by rotating the cutter post in its support, two of the cutting ribs may be brought into action for simultaneous cutting. In this manner of use, the cutting element is rotated for about 45° from the position as shown in Figures 2 and 5 so that one of the ribs is slightly in advance of the other whereby as the cutting is performed, one of the ribs, which may be considered the leading rib, will be set to make a deep or rough cut while the other or trailing rib will be set to make a shallow or finishing cut upon the work. Thus, the finishing of a piece of work may be greatly expedited thru this means of a double cut performed by a single cutting element. Though not shown in the drawings, if so desired, the pins 41 as shown in Figure 5 may be dispensed with whereby the cutting element may be rotatively adjustable about the round stem portion 31' for disposing the cutting ribs in any adjusted relation with respect to the work.

The cutting tool assembly is also especially well adapted for use in working upon convex surfaces such as ellipsoids, etc., as well as upon concave surfaces such as hyperboloids. When so employed, as the cutting element moves along a convex surface for instance, the cutting action of the semi-circular cutting edge 38 will constantly shift about the cutting edge. That is, when the cutting element is at one end of the convex surface one end portion of the semi-circular cutting edge will be cutting, and as the tool assembly advances along the work, the cutting action gradually shifts along the curved cutting edge to the opposite end portion of the cutting surface. The cutting tool will be found extremely efficient in expediting the turning and finishing of the convex surfaces of projectiles, bombs, torpedo casings, etc.

While the cutting elements have been described as preferably being formed from a grade of steel known as "Rex AA" cutting tool bit steel, if so desired, the major portion of the cutting element may be formed from any suitable steel and the ends of the cutting ribs provided with insets of "Rex AA" cutting tool bit steel. Likewise, the number of cutting ribs may vary, as well as the spacing of the ribs about their hub portion.

Changes in detail may be made to the forms of the invention herein shown and described, without departing from the spirit of the invention, or the scope of the following claims.

I claim:

1. A cutter tool assembly comprising a tool bar, a tool support, means adjustably mounting the tool support upon the outer end of the tool bar, a cutter post longitudinally and rotatively adjustable in the tool support, and a multiple cutting head element mounted upon the cutter post and adjustable for selectively disposing the cutting heads in cutting position.

2. A cutter tool assembly comprising a tool bar adapted to be secured in a tool post etc., a tool support adjustably mounted on the tool bar and including a rest portion, a cutter post longitudinally adjustable in the rest portion, a cutting element fitting on the cutter post and having a series of independent cutting edges at each end thereof, and means for securing the cutting element upon the cutter post for disposing a selected cutting edge in a cutting position.

3. A cutter tool assembly comprising a tool bar adapted to be secured in a tool post, a tool support adjustably mounted on the tool bar and including a rest portion, a cutter post longitudinally adjustable in the rest portion, a cutting element fitting on the cutter post and having a series of independent cutting edges at each end thereof, and means adjustably securing the cutting element upon the cutter post with two adjacent cutting edges at one end of the cutting element in cutting relation to the work.

4. A cutter tool assembly comprising an adjustable tool holder including a tool support, a cutter post adjustable in the tool support, a cutting element slidably fitting on the cutter post and including radially extending spaced apart ribs having a cutting edge at each end thereof, and means for securing the cutting element on the cutter post.

5. A cutter tool assembly comprising a tool holder including a rest portion, a cutter post longitudinally adjustable in the rest portion and including a stem portion, a cutting element reversible and non-rotatably fitting on the stem portion and provided with spaced apart longitudinal cutting ribs each having a cutting edge at each end thereof, and means for retaining the cutting element upon said stem portion.

6. A cutter tool assembly comprising a tool bar having a head at one end, an L-shaped tool support having a head at the end of one arm and a rest portion at the free end of its other arm, means pivotally and adjustably connecting said heads, a cutter post adjustable in said rest portion and having a stem portion paralleling the head carrying arm of the tool support, a reversible cutting element non-rotatably fitting on said stem portion and provided with spaced apart cutting edges at each end thereof, and means securing the cutting element on the stem portion.

7. In a cutting tool assembly, a rest portion, a cutter post adjustable in the rest portion and embodying a polygonal-shaped stem portion, a cutting element having a polygonal-shaped opening slidably fitting over said stem portion and provided with a series of elongated radially projecting cutting ribs each having a cutting edge at each end thereof, and means for securing the cutting element on said stem portion.

8. In a cutting tool assembly, a tool support including a rest portion, a cutter post including a shank adjustably mounted in the rest portion, a collar at the upper end of the shank and a square stem portion extending above the collar, a reversible cutting element having a square bore fitting said square stem, said cutting element having longitudinal cutting ribs provided with a cutting edge at each end thereof, and means for clamping the cutting element upon said collar.

9. In a cutting tool assembly, a tool support including a rest portion, a cutter post adjustably mounted in the rest portion and including a stem portion, a cutting element reversible on and rotatively adjustable thru fixed degrees of rotation on the stem portion, cutting ribs on the cutting element providing a series of spaced apart cutting edges at each end of the cutting element, and means for securing the cutting element against longitudinal movement on said stem portion.

10. In a cutter tool assembly, a cutter post including a stem portion having a collar at one end and being threaded at its other end, a cutting element including a hub portion and cutting ribs extending radially of the hub portion, reversibly fitting on said stem portion, said cutting ribs each having a cutting edge at each end thereof, and a nut threaded upon the threaded end of the stem portion for clamping the cutting element against said collar.

11. In a cutter tool, a cutter post including a mounting shank, a collar at one end of the shank and a square stem portion extending from the collar and having a threaded end, a cutting element including a hub portion having a square opening receiving said stem portion and a series of cutting ribs extending radially of the hub and having a cutting edge at each end thereof, and a clamping nut threaded on the threaded end of the stem portion.

12. In a cutter tool, a cutter post including a mounting shank, a collar at one end of the shank and a square stem portion extending from the collar and having a threaded end, a cutting element including a hub portion having a square opening receiving said stem portion, a series of four cutting ribs spaced 90° apart about the hub and each having a cutting edge at each end thereof, and a nut threaded upon the stem portion for clamping the cutting element upon said collar.

13. In a cutter tool, a cutter post including a mounting shank having a collar at one end and a round stem portion extending from the collar, keeper pins projecting from the collar, a cutting element including a hub portion having a round bore receiving said stem portion and evenly spaced apart recesses at one end of the hub for receiving said keeper pins for retaining the cutting element in definite positions of rotary adjustment, a series of cutting ribs extending radially from said hub and each having a cutting edge at each end thereof, and a nut threaded upon the stem portion for retaining the cutting element in position on the stem portion.

14. In a tool, a cutter post including a stem, and a cutting element reversible end for end upon the stem and rotatively adjustable on the stem thru fixed positions of 90°, said cutting element having elongated cutting ribs spaced 90° apart and provided with rounded outer edges forming semi-circular-shaped cutting edges at each end of each rib.

15. In a tool, a cutter post including a stem, and a cutting element reversible end for end upon the stem and rotatively adjustable on the stem thru fixed positions of 90°, said cutting element having elongated cutting ribs arranged 90° apart and being of different shape in cross section providing cutting edges of different shape at the ends of the cutting element.

JAMES A. ANANIA.